(12) United States Patent
Alport et al.

(10) Patent No.: US 8,177,051 B2
(45) Date of Patent: May 15, 2012

(54) MONITORING OF CONVEYOR BELTS

(75) Inventors: Michael John Alport, Durban (ZA); Jacques Frederick Basson, Durban (ZA); Thavashen Padayachee, Durban (ZA)

(73) Assignee: Advanced Imaging Technologies (Proprietary) Limited, Durban (ZA)

( * ) Notice: Subject to any disclaimer, the term of this patent is extended or adjusted under 35 U.S.C. 154(b) by 0 days.

(21) Appl. No.: 12/449,157

(22) PCT Filed: Jan. 24, 2008

(86) PCT No.: PCT/IB2008/050254
§ 371 (c)(1), (2), (4) Date: Mar. 8, 2010

(87) PCT Pub. No.: WO2008/090522
PCT Pub. Date: Jul. 31, 2008

(65) Prior Publication Data
US 2010/0187072 A1   Jul. 29, 2010

(30) Foreign Application Priority Data
Jan. 26, 2007   (ZA) .................................. 2007/00760

(51) Int. Cl.
*B65G 43/00*   (2006.01)

(52) U.S. Cl. ................................................. 198/810.02
(58) Field of Classification Search ............. 198/810.02
See application file for complete search history.

(56) References Cited

U.S. PATENT DOCUMENTS

| | | | | |
|---|---|---|---|---|
| 5,168,266 | A * | 12/1992 | Fukuda | 198/810.02 |
| 6,047,814 | A * | 4/2000 | Alles et al. | 198/810.02 |
| 7,275,637 | B2 * | 10/2007 | Brown | 198/810.02 |
| 2007/0278068 | A1 * | 12/2007 | Wallace et al. | 198/810.02 |
| 2008/0308391 | A1 * | 12/2008 | May | 198/810.02 |

FOREIGN PATENT DOCUMENTS
EP   0 590 734   4/1994
GB   2 303 834   3/1997

* cited by examiner

*Primary Examiner* — James R Bidwell
(74) *Attorney, Agent, or Firm* — Drinker Biddle & Reath LLP

(57) ABSTRACT

A system for monitoring the condition of a conveyor belt having magnetically permeable cords, has a magnetic field generator, a magnetic field sensing unit, and a processor for performing a discrete wavelet transform. The wavelet may be a Morlet waveform. The sensing unit can include an array of spaced magnetic field sensors, and the transform can be performed on signals supplied by the sensors.

18 Claims, 3 Drawing Sheets

MONITORING OF CONVEYOR BELTS

CROSS REFERENCE TO RELATED APPLICATIONS

This application is a national stage of PCT/IB2008/050254, filed on Jan. 24, 2008, which claims priority from South African application no. 2007/00760, filed on Jan. 26, 2007, both of which are incorporated herein in their entirety by reference.

FIELD OF THE INVENTION

This invention relates to monitoring the condition of conveyor belts. More particularly it relates to a system for and a method of monitoring the condition of conveyor belts having magnetically permeable cords. It extends to a conveyor belt arrangement which has the system.

BACKGROUND OF THE INVENTION

It is well known that the complete failure of steel cord-reinforced conveyor belts as used on conveyor belt structures in various mining and industrial applications can have catastrophic results. As such, condition monitoring of these conveyor belts has become common practice, the objective being to identify damage to conveyor belts and thus to effectively maintain conveyor belts, thereby to ensure that the possibility of complete failure is substantially reduced.

A typical steel cord-reinforced conveyor belt as herein envisaged is made up of elongated conveyor belt sections, typically in the order of 300 m in length. Each section comprises a central layer of multi-stranded steel cords sandwiched in a substantially equally-spaced, parallel configuration between two rubber layers, the sections being connected by means of splices. A splice between two sections is formed by overlapping the ends of the two sections by from one five meters and vulcanizing the sections together. When the sections are so connected, the cords of the sections in the overlapping region are arranged in a pattern in which alternating cords of the sections lie in a parallel adjacent relationship.

A damaged conveyor belt region may constitute a region where one or more individual strand of a cord of a conveyor belt, or a complete cord, is broken, frayed, corroded, or otherwise damaged. It is known to monitor a conveyor belt for such damage by magnetizing the cords of the conveyor belt and sensing for a magnetic field adjacent the conveyor belt, a magnetic field so sensed being indicative of cord damage. Known apparatus for the purpose include coil-type magnetic sensors, one particular known arrangement having four such sensors spaced across the width of the conveyor belt monitored, so that each sensor serves to identify cord damage in a transverse quarter segment of the conveyor belt. Although sufficient to indicate cord damage, the exact location of a damaged cord within a quadrant of the belt width still remains difficult to establish. Also, because a coil-type magnetic sensor in fact senses the rate of change of magnetic field strength within the region where a cord is damaged, it has been found that although a damaged region is adequately indicated, the nature of the damage and the deterioration rate of a damaged cord cannot be established or monitored and, as such, it still remains difficult to establish exactly when conveyor belt maintenance should be optimally performed.

Other condition monitoring apparatus for steel cord-reinforced conveyor belts that utilize generally the above principles also are known, but these are associated with the same inadequacies and it is thus an object of this invention to provide a method of and an apparatus for the above purpose and in respect of which the above inadequacies are at least ameliorated.

BRIEF SUMMARY OF THE INVENTION

According to the invention there is provided a system for monitoring the condition of conveyor belts having magnetically permeable cords, which includes
  a magnetic field generator for generating a magnetic field to magnetize the cords, in use;
  a magnetic field sensing unit for sensing the magnetic field provided, in use, by the cords and for providing signals representative of the magnetic field; and
  a processor for performing a discrete wavelet transform on the signals.

Further according to the invention there is provided a method of monitoring the condition of conveyor belts having magnetically permeable cords, which includes
  generating a magnetic field to magnetize the cords;
  sensing the magnetic field provided by the cords and providing signals representative of the magnetic field; and
  performing a discrete wavelet transform on the signals.

Still further according to the invention, there is provided a conveyor belt arrangement, which includes
  a belt having a plurality of magnetically permeable cords; and
  a system for monitoring the condition of the belt as described above, the magnetic field generator and the magnetic field sensing unit thereof being positioned adjacent the belt and longitudinally spaced from one another.

The magnetic field generator may comprise permanent magnets or electromagnets.

The sensing unit may comprise an array of spaced magnetic field sensors, the transform being performed on the signals from the sensors.

The wavelet may be a Morlet wavelet.

The system may include processing equipment for processing the signals received from the sensors and performing the transform. The processing equipment may have multiple channels or may be of the multiplexed type. If multiplexing is utilised then either analogue or digital multiplexing may be utilized.

Conveniently, the magnetic field may be digitized and the digital data may be convolved with the Morlet wavelet function. Further, a Fast Fourier Transform ("FFT") may be used.

It will be appreciated by those skilled in the art that the system may include a belt speed determining means for determining the speed of travel of the belt in the longitudinal direction. The belt speed determining means may include an encoder connected to a pulley of the conveyor belt arrangement.

BRIEF DESCRIPTION OF THE SEVERAL VIEWS OF THE DRAWINGS

The invention will now be described by way of non-limiting examples, with reference to the accompanying schematic drawings, in which.

DETAILED DESCRIPTION OF THE INVENTION

Figure 1:
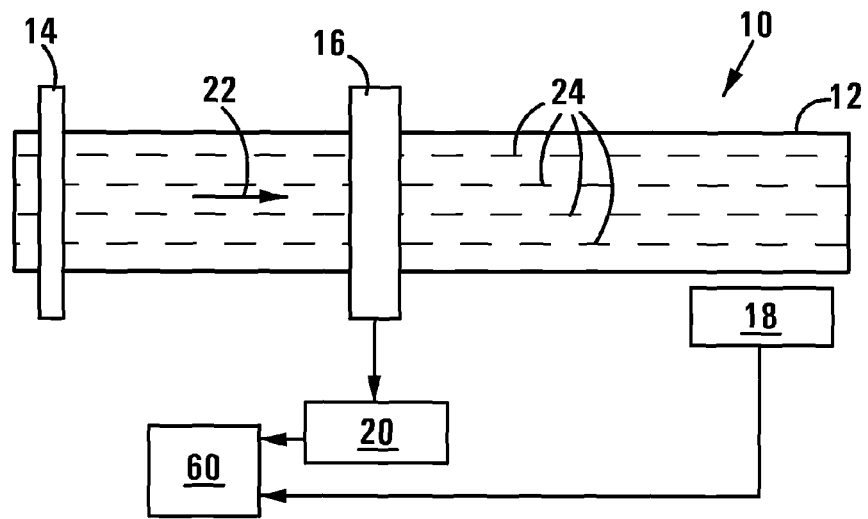
FIG. 1 shows schematically a conveyor belt arrangement in accordance with the invention.

Referring to FIG. 1, a conveyor belt arrangement in accordance with the invention is designated generally by reference numeral 10. The arrangement 10 has a conveyor belt 12, a magnetic field generator 14, a magnetic field sensing unit 16, an encoder 18 for determining the speed of travel of the belt 12 and processing equipment 20 for processing signals received from the field sensing unit 16. The direction of travel of the belt 12 is indicated by arrow 22. The field generator 14 and the field sensing unit 16 extend across the belt 12 and are mounted about 4 cm to 5 cm above the belt 12. The encoder 18 is connected to a pulley of the arrangement 10, to monitor the speed of travel of the belt 12.

It will be appreciated that the direction of travel 22 defines a longitudinal direction, with a transverse direction being defined across the belt 12 and a perpendicular direction being defined perpendicular to the belt 12.

This belt 12 transports bulk material such as coal, iron ore and the like. It is constructed of a rubber matrix in which is imbedded a number of cords 24 that are comprised of braided strands of steel wire that run along the length of the belt 12. These cores are thus magnetically permeable. Typical belts have cord spacing of 10 mm to 25 mm. Clearly, the number of cords 24 in a belt 12 will depend on the spacing of he cords 24 and the width of the belt 12. Although only four cords 24 are shown in FIG. 1 it will be appreciated that in practice a larger number of cords 24 will typically be used.

In use, as is known in the art, a magnetic field is generated by the field generator 14 which magnetises the cords 24. If there is a break in a cord 24 then fringing (or leakage) magnetic fields result around these breaks that are sensed by sensors of the field sensing unit 16. Signals provided by the field sensing unit 16 are processed by the processing equipment 20, in accordance with the invention, as is explained in more detail below.

Figure 2:
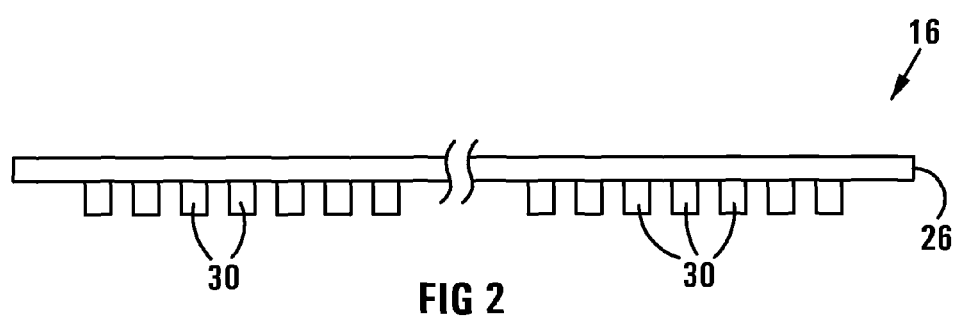
FIG. 2 shows schematically an array of sensors which is part of the system of FIG. 1.

Referring now to FIG. 2, an embodiment of the field sensing unit 16 is shown. This field sensing unit 16 has an elongated carrier 26 on which are mounted a number of sensors 30. The sensors 30 each have a sensing axis. It will be appreciated that when the carrier 26 is placed in position across and above the belt 12, the sensors 30 will point down such that they will measure the vertical component of the magnetic field.

The sensors 30 are spaced between 2 mm to 20 mm depending on the scale size of the transverse structure.

The sensors 30 are Hall effect sensors and are supplied by Allegro Microsystems, with part number A1302KLHLt-T.

Figure 3:
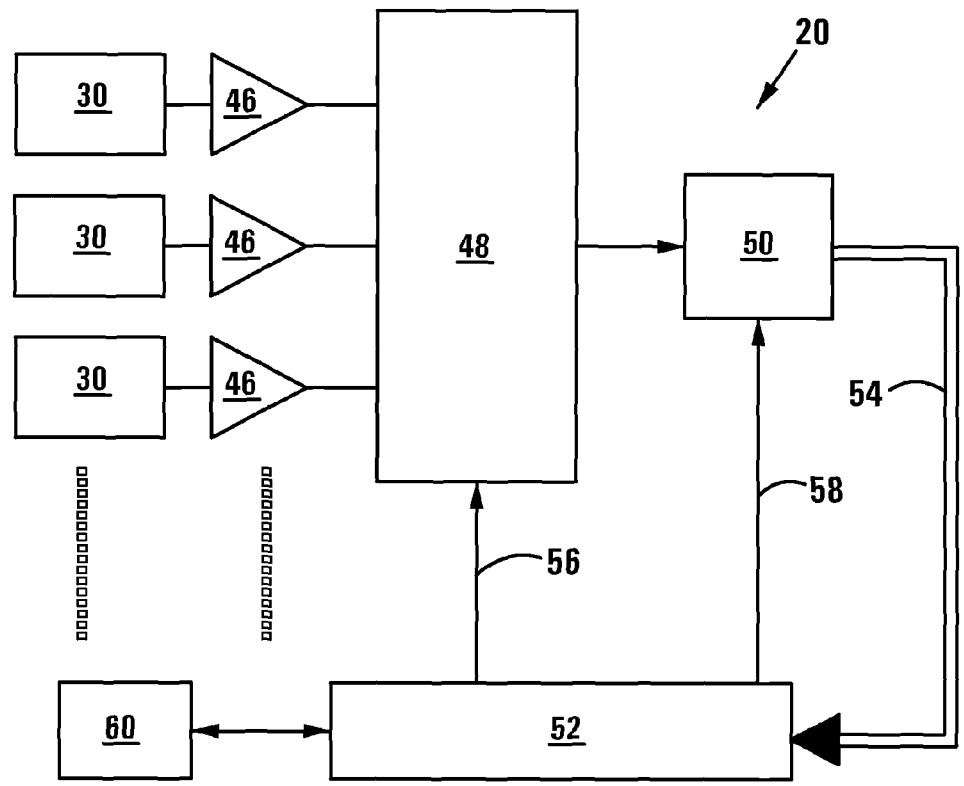
FIG. 3 shows schematically an embodiment of processing equipment which is part of the system of FIG. 1.

Referring now to FIG. 3 an embodiment of processing equipment 20 for processing the signals received from the sensors 30 is shown. The equipment 20 has a buffer 46 for each sensor 30 which supplies an analog multiplexer 48 with buffered signals. The output of the multiplexer 48 is supplied to an A/D converter 50, the digital output of which is supplied to a field programmable gate array (FPGA) 52 via a data bus 54. The FPGA 52 is connected to the multiplexer 48 and the converter 50 by command links 56 and 58. The FPGA 52, in turn, supplies data signals to a processor 60.

The analog voltages from each of the sensors 30 are first amplified and filtered by the buffers 46. The filtered analog values are fed into the n-channel multiplexer 48. In is the number of sensors 30. The command outputs from the FPGA 52 determines which analog input value is switched through to the output of the multiplexer 48. Typically devices with only a maximum of 16 channel multiplexers are available. However, the number of channel inputs can be increased by connecting a number of slave multiplexers to one master multiplexer. For example, the outputs of sixteen 16-channel slave multiplexers can be connected to the inputs of a single master multiplexer. This particular configuration will result in the equivalent of a single 16×16=256 channel multiplexer. The analog voltage outputs from, typically 256, channels are converted to their digital values by the single A/D converter 50. The A/D converter 50 must be capable of sampling at a rate equal to $n.f_{samp}$ where n is the number of analog channels and $f_{samp}$ is the sampling frequency of each channel. The FPGA 52 sends out the required convert signal to the A/D converter 50, thus determining the sampling rate. The digital outputs from he A/D converter 50 are received by the FPGA 52 and sent to the processor 60 via a suitable (eg ISA) bus.

Figure 6:
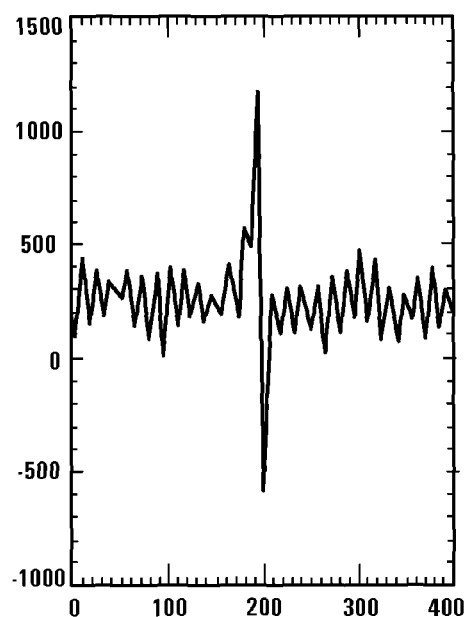
FIG. 6 shows a typical plot of the perpendicular component of the magnetic field above a broken cord in a conveyor belt.

Those skilled in the art will be aware that a break in a cord which has been previously magnetized produces a fringing magnetic field with North and South poles being formed at the cord ends. In trying to analyse such magnetic field data to understand the structure and location of the breaks in the cords, there are a number of problems. A typical plot of the magnetic field resulting from a break is shown in FIG. 6. Firstly, as seen, the magnetic signal is bipolar and the center of the break actually corresponds to the zero-crossing of the magnetic field. Thus the center of the damage does not correspond to the maximum of the magnetic field. Secondly, there are often noise components due to electrical interference, or in this case an oscillation of the belt as can be seen by the sinusoidal oscillations on either side of the bipolar signal. Both these problems can be minimized by convolving the magnetic signal with a suitable wavelet function. A suitable wavelet that has a basis function of appropriate shape is the Morlet function. This is a complex function that has an asymmetric imaginary part which reflects the characteristic shape of the magnetic dipole variation. By matching the shape of wavelet function to the raw magnetic field data gives this technique the important advantage of discriminating against the sinusoidal oscillations referred to above due to belt flutter.

In real space, the Morlet wavelet function consists of a complex exponential modulated by a Gaussian envelope:

$$w_{k,s}(x) = \pi^{-1/4} s^{-1/2} \exp\left(\frac{ikx}{s}\right) \exp\left[\frac{-(x/s)^2}{2}\right]$$

where s is the wavelet scale, k is a non-dimensional parameter that determines the number of cycles in the Gaussian envelope, and x is the spatial position. Although here x is the spatial position, this may also be transformed into time using x=v.t where v is the speed of the belt.

Figure 4A:
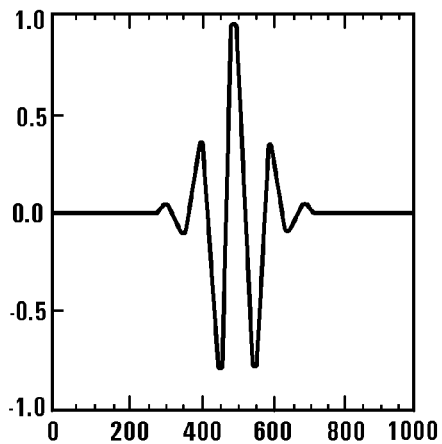
FIG. 4 shows schematically the Morlet wavelet function, with FIG. 4A showing the real part and FIG. 4B the imaginary part thereof.
Figure 4B:
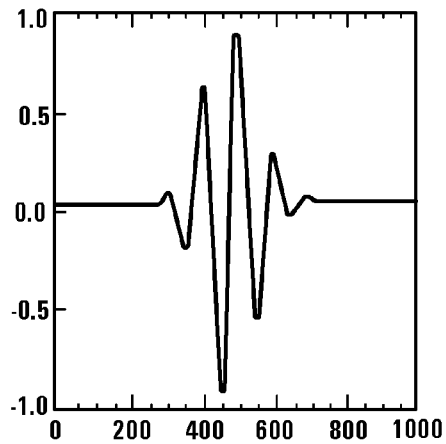

The complex Morlet function, shown in FIG. 4 consists of a sinusoidal waveform of frequency k, modulated by a Gaussian having a width of s. The real part is a sine function and the imaginary part is a cosine function.

The choice of s will depend on the scale size of the magnetic fringing field in the x-direction and the sampling frequency.

For example, s needs to be smaller for cord breaks than for the splice. In general, the optimal value of s is obtained by examining the wavelet spectrum which is a 2-dimensional plot of s on the y-axis and t on the x-axis and calculated by evaluating w for different scale sizes s.

In practice, for a sampling frequency of 125 Hz, k and s are chosen to be 15 and 3 respectively.

As indicated above, the processor 60 performs a discrete Morlet wavelet transform on the data signals for each sensor 30.

In order to calculate a damage image the magnetic data is convolved with the Morlet wavelet function. This is done in a computationally efficient way using the convolution theorem.

The convolution theorem states that if X(f) is the Fourier transform of x(t) i.e. $\Im(x(t))=X(f)$ then the convolution of two functions h(t) and (t) then $\Im\{f(t)\circ h(t)\}=F(f)\cdot H(f)=G(f)$ i.e., convolving in real space is equivalent to multiplying in frequency (transform) space.

In order to calculate the convolution of the raw magnetic field data and the Morlet function in a computationally efficient way, the Fast Fourier Transform (FFT) is used.

The damage image is obtained by convolving the Morlet function with the data captured from the sensors on a line by line basis, where each line is obtained by digitizing a sensor output for a certain time interval thus capturing a time series $B_z(t)$. Each line of $B_z$ data will contain $2^n$ points, i.e. 1024 points for n=10. If the sensors are sampled at 200 Hz, then a line of data will be sampled from each sensor in $1024\times(1/200)=5.12$ seconds. Since the Morlet wavelet is complex, the absolute value needs to be taken to give the Damage data (D(t), for each line thus:

$$D(t)=|\Im^{-1}\{\Im[w_{k,s}(t)]^* \times \Im[B_z(t)]\}| \qquad \text{Eqn 1}$$

The damage image is then obtained by stacking the damage lines one above each other to form a 2-dimensional image.

Figure 5:
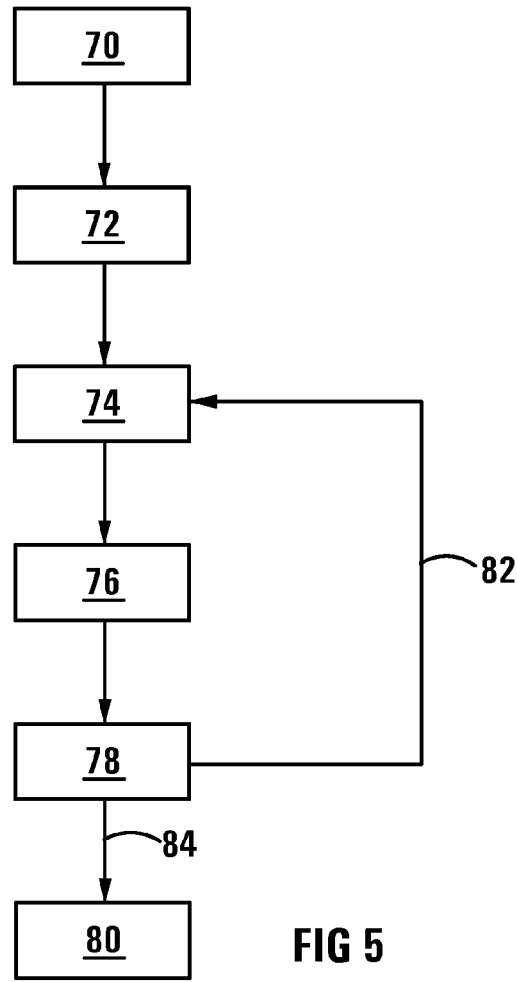
FIG. 5 shows a flow diagram indicating the computational sequence required to capture, calculate and display a damage image.

The computational steps needed to calculate the damage image from the captured values of $B_z$ obtained from the sensor array is indicated in the flow diagram of FIG. 5. Thus, the following steps are followed:

Step 70: Calculates $w_{k,s}(t)$ and $W_{k,s}(f)=\Im[w_{k,s}(t)]$.

Step 72: Set i=1 where i denotes the $i^{th}$ sensor for i–1,2, 3 . . . n and n=the number of sensors.

Step 74: Capture the time series $B_{i,z}(t)$ at 200 Hz, which consists of 1024 samples.

Step 76: Calculate the $i^{th}$ line, $D_i(t)$ in the damage image using Eqn 1.

Step 78: Set i=i+1, Is i=n?. If not return to step 74 as indicated by arrow 82.

If yes go to step 80 as indicated by arrow 84.

Step 80: Display the damage image.

In practice, the voltage outputs from all the sensors 30 are captured continuously using an interrupt routine and buffered in an array. This data in this array is subsequently used to calculate the damage image.

Figure 7:
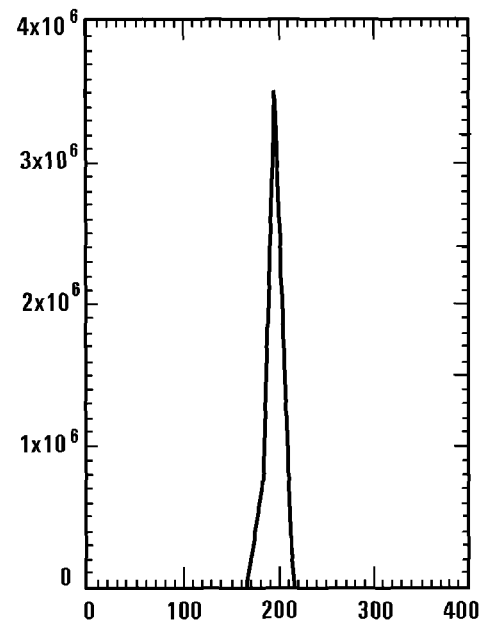
FIG. 7 shows the result of convolving the data in FIG. 6 with a Morlet wavelet function.

A typical damage image is shown in FIG. 7. As seen therein, after convolution of the magnetic data with a Morlet wavelet function, the wavelet filtered output shows a single peak with the noise components much attenuated. Thus, by means of the invention, a cord break and its position are much easier to recognize when compared with a direct plot of the magnetic field.

The invention claimed is:

1. A system for monitoring a condition of a conveyor belt having magnetically permeable cords, comprising:
    a magnetic field generator that generates a magnetic field to magnetize the cords, in use;
    a magnetic field sensing unit that senses a magnetic field provided, in use, by the cords and that provides signals representative of the magnetic field provided by the cords; and
    a processor that performs a discrete wavelet transform on the signals,
    wherein the discrete wavelet transform includes convolution of the signals with a wavelet function.

2. A system as claimed in claim 1, in which the sensing unit comprises an array of spaced magnetic field sensors, the transform being performed on signals supplied by the sensors.

3. A system as claimed in claim 1, in which the wavelet is a Morlet wavelet.

4. A system as claimed in claim 2, which includes processing equipment that processes the signals supplied by the sensors.

5. A system as claimed in claim 4, in which the processing equipment includes a digitizer that provides the signals in digital data form.

6. A system as claimed in claim 5, in which the processor convolves the digital data with the wavelet.

7. A system as claimed in claim 1, which includes a belt speed determining means for determining the speed of travel of the belt in a longitudinal direction.

8. A system as claimed in claim 7, in which the belt speed determining means includes an encoder connectable to a pulley of a conveyor belt arrangement.

9. A system as claimed in claim 4, in which the processing equipment has at least one A/D converter.

10. A system as claimed in claim 4, in which the processing equipment includes a multiplexer.

11. A method of monitoring a condition of a conveyor belt having magnetically permeable cords, comprising:
    generating a magnetic field to magnetize the cords;
    sensing a magnetic field provided by the cords and providing signals representative of the magnetic field provided by the cords; and
    performing a discrete wavelet transform on the signals,
    wherein the discrete wavelet transform includes convolution of the signals with a wavelet function.

12. A method as claimed in claim 11, in which the magnetic field provided by the cords is sensed by an array of spaced magnetic field sensors, the transform being performed on signals supplied by the sensors.

13. A method as claimed in claim 11, in which the wavelet is a Morlet wavelet.

14. A method as claimed in claim 12, in which the signals supplied by the sensors are digitized and provided in digital data form.

15. A method as claimed in claim 14, in which the digital data is convolved with the wavelet.

16. A method as claimed in claim 11, which includes determining a speed of travel of the belt.

17. A method as claimed in claim 12, which the signals from the sensors are multiplexed.

18. A conveyor belt arrangement, which includes
    a belt having a plurality of magnetically permeable cords; and
    a system for monitoring the condition of the belt as claimed in claim 1, the magnetic field generator and the magnetic field sensing unit thereof being positioned adjacent the belt and longitudinally spaced from one another.

* * * * *